(12) United States Patent
Gavin et al.

(10) Patent No.: US 11,095,735 B2
(45) Date of Patent: Aug. 17, 2021

(54) CONFIGURATION OF EVENT DATA COMMUNICATION IN COMPUTER NETWORKS

(71) Applicant: TEALIUM INC., San Diego, CA (US)

(72) Inventors: Tyron G. Gavin, Escondido, CA (US); Christopher Kirk Finley, San Marcos, CA (US); Craig P. Rouse, Didcot (GB)

(73) Assignee: TEALIUM INC., San Diego, CA (US)

( * ) Notice: Subject to any disclaimer, the term of this patent is extended or adjusted under 35 U.S.C. 154(b) by 0 days.

(21) Appl. No.: 16/985,539

(22) Filed: Aug. 5, 2020

(65) Prior Publication Data

US 2021/0044666 A1 Feb. 11, 2021

Related U.S. Application Data

(60) Provisional application No. 62/883,527, filed on Aug. 6, 2019.

(51) Int. Cl.
*H04L 29/08* (2006.01)
*H04L 12/26* (2006.01)

(52) U.S. Cl.
CPC ............ *H04L 67/22* (2013.01); *H04L 43/06* (2013.01)

(58) Field of Classification Search
None
See application file for complete search history.

(56) References Cited

U.S. PATENT DOCUMENTS

| | | | |
|---|---|---|---|
| 6,058,482 A | 5/2000 | Liu | |
| 6,098,064 A | 8/2000 | Pirolli | |
| 6,141,010 A | 10/2000 | Hoyle | |
| 6,189,016 B1 | 2/2001 | Cabrera | |
| 6,341,353 B1 | 1/2002 | Herman et al. | |
| 6,681,370 B2 | 1/2004 | Gounares et al. | |
| 6,771,290 B1 | 8/2004 | Hoyle | |
| 7,047,277 B1 | 5/2006 | Welter et al. | |
| 7,136,931 B2 | 11/2006 | Natarajan | |
| 7,257,689 B1 | 8/2007 | Baird | |
| 7,383,231 B2 | 6/2008 | Gupta et al. | |
| 7,502,760 B1 | 3/2009 | Gupta | |
| 7,599,856 B2 | 10/2009 | Agrawal et al. | |

(Continued)

OTHER PUBLICATIONS

How to Use SNMP Agent Extension, Centreon, http://doc.cnetreon.com/HowToUseSNMPAgentExtension, dated Feb. 24, 2010, in 2 pages.

(Continued)

*Primary Examiner* — Brian Whipple
(74) *Attorney, Agent, or Firm* — Knobbe, Martens, Olson and Bear LLP

(57) ABSTRACT

In some embodiments, a system is disclosed for processing event data for an application and transmitting the event data via a computer network. The system can include a memory device and a hardware processor. The memory device can store an application. The hardware processor can execute the application, characterize a user engagement with the application as being a first level of engagement or a second level of engagement, generate event data responsive to user interactions with the application, and control the batch collection of the event data depending on whether the user engagement with the application is characterized as the first level of engagement or the second level of engagement.

20 Claims, 6 Drawing Sheets

(56) References Cited

U.S. PATENT DOCUMENTS

| | | |
|---|---|---|
| 7,644,042 B2 | 1/2010 | Ramavarjula |
| 7,788,233 B1 | 8/2010 | Iyer |
| 7,831,562 B1 | 11/2010 | DeVos |
| 8,166,474 B1 | 4/2012 | Delco et al. |
| 8,250,196 B2 | 8/2012 | Demir et al. |
| 8,443,036 B2 | 5/2013 | Li et al. |
| 8,515,931 B1 | 8/2013 | Amacker |
| 8,533,305 B1 | 9/2013 | Keagy et al. |
| 8,805,946 B1 | 8/2014 | Glommen et al. |
| 8,806,482 B1 | 8/2014 | Nagargadde et al. |
| 8,843,827 B2 | 9/2014 | Koo et al. |
| 8,904,278 B1 | 12/2014 | Anderson et al. |
| 8,990,298 B1 | 3/2015 | Anderson |
| 9,081,789 B2 | 7/2015 | Anderson |
| 9,313,287 B2 | 4/2016 | Glommen et al. |
| 9,363,311 B1 | 6/2016 | McWilliams et al. |
| 9,537,964 B2 | 1/2017 | Glommen et al. |
| 9,753,898 B1 | 9/2017 | Glommen et al. |
| 9,785,664 B2 | 10/2017 | Qian et al. |
| 9,807,184 B1 | 10/2017 | Slovak et al. |
| 10,078,708 B2 | 9/2018 | Slovak |
| 10,268,657 B2 | 4/2019 | Kirk et al. |
| 10,327,018 B2 | 6/2019 | Anderson et al. |
| 2002/0010679 A1 | 1/2002 | Felsher |
| 2002/0027567 A1 | 3/2002 | Niamir |
| 2002/0059325 A1 | 5/2002 | Beizer et al. |
| 2002/0073043 A1 | 6/2002 | Herman et al. |
| 2002/0116318 A1 | 8/2002 | Thomas et al. |
| 2002/0129166 A1 | 9/2002 | Baxter et al. |
| 2002/0161757 A1 | 10/2002 | Mock et al. |
| 2003/0125924 A1 | 7/2003 | Lines |
| 2003/0126200 A1 | 7/2003 | Wolff |
| 2003/0173402 A1 | 9/2003 | Ogawa |
| 2003/0217040 A1 | 11/2003 | Osborne |
| 2003/0229529 A1 | 12/2003 | Mui |
| 2004/0034752 A1 | 2/2004 | Oh Ran |
| 2004/0039962 A1 | 2/2004 | Ganesh |
| 2004/0165581 A1 | 8/2004 | Oogushi |
| 2004/0240455 A1 | 12/2004 | Shen |
| 2005/0063395 A1 | 3/2005 | Smith |
| 2005/0071754 A1 | 3/2005 | Morgan et al. |
| 2005/0234936 A1 | 10/2005 | Castro et al. |
| 2005/0240943 A1 | 10/2005 | Smith et al. |
| 2006/0010103 A1 | 1/2006 | Malik |
| 2006/0014523 A1 | 1/2006 | Reilly |
| 2006/0020501 A1 | 1/2006 | Leicht |
| 2006/0095481 A1 | 5/2006 | Singh |
| 2006/0161635 A1 | 7/2006 | Lamkin et al. |
| 2006/0235938 A1 | 10/2006 | Pennell |
| 2006/0259949 A1 | 11/2006 | Schaefer |
| 2007/0038516 A1 | 2/2007 | Apple |
| 2007/0050696 A1 | 3/2007 | Piersol |
| 2007/0150948 A1 | 6/2007 | De Spiegeleer |
| 2007/0153808 A1 | 7/2007 | Parker |
| 2007/0186150 A1 | 8/2007 | Rao |
| 2007/0192329 A1 | 8/2007 | Croft |
| 2007/0203937 A1 | 8/2007 | Prahlad |
| 2008/0086777 A1 | 4/2008 | Sanchez |
| 2008/0155537 A1 | 6/2008 | Dinda et al. |
| 2008/0228772 A1 | 9/2008 | Plamondon |
| 2008/0228914 A1 | 9/2008 | Ofel et al. |
| 2008/0229020 A1 | 9/2008 | Plamondon |
| 2008/0229025 A1 | 9/2008 | Plamondon |
| 2008/0235132 A1 | 9/2008 | Banatre |
| 2008/0263297 A1 | 10/2008 | Herbst et al. |
| 2009/0077173 A1 | 3/2009 | Lowery et al. |
| 2009/0180138 A1 | 7/2009 | Fukuda |
| 2009/0248695 A1 | 10/2009 | Ozzie et al. |
| 2009/0248896 A1 | 10/2009 | Cohn |
| 2010/0027420 A1 | 2/2010 | Smith |
| 2010/0088398 A1 | 4/2010 | Plamondon |
| 2010/0107162 A1 | 4/2010 | Edwards et al. |
| 2010/0185693 A1 | 7/2010 | Murty et al. |
| 2010/0250907 A1 | 9/2010 | Dehaan |
| 2010/0281112 A1 | 11/2010 | Plamondon |
| 2011/0047262 A1* | 2/2011 | Martin ................. H04L 41/064 709/224 |
| 2011/0055683 A1 | 3/2011 | Jiang |
| 2011/0082902 A1 | 4/2011 | Rottler et al. |
| 2011/0088086 A1 | 4/2011 | Swink et al. |
| 2011/0112901 A1 | 5/2011 | Fried et al. |
| 2011/0208582 A1 | 8/2011 | Hoyle |
| 2011/0218860 A1 | 9/2011 | Barber |
| 2011/0246647 A1 | 10/2011 | Marquezan |
| 2011/0307561 A1 | 12/2011 | Gao |
| 2012/0209581 A1 | 8/2012 | Gao |
| 2013/0122854 A1* | 5/2013 | Agarwal ............... G06F 3/0482 455/405 |
| 2013/0173402 A1 | 7/2013 | Young |
| 2013/0173540 A1 | 7/2013 | Qian |
| 2014/0089243 A1* | 3/2014 | Oppenheimer ......... G06F 21/88 706/46 |
| 2015/0294377 A1 | 10/2015 | Chow |
| 2018/0115654 A1* | 4/2018 | Imai .................. H04N 1/00037 |
| 2018/0270685 A1* | 9/2018 | Lee .......................... H04L 43/06 |
| 2018/0302302 A1* | 10/2018 | Doggett .................... G06F 8/61 |
| 2019/0373071 A1* | 12/2019 | Ramachandran ..... G06F 9/4451 |

OTHER PUBLICATIONS

Understanding Simple Network Management Protocol (SNMP) Traps, Cisco, Document ID: 7244, http://www.cisco.com/application/pdf/paws/7244, dated Oct. 10, 2006, in 5 pages.

Working with the Measurement Protocol—Analytics Measurement Protocol, Google Developers, https://developers.google.com/analytics/devguides/collection/protocol/v1/devguide#batch-limitations, dated May 27, 2019, in 14 pages.

Progressive Web Apps, Google Developers, https://developers.google.com/web/progressive-web-apps, dated May 26, 2019, in 5 pages.

Introduction to HTTP/2, Google Developers, https://web.archive.org/web/20190731062328/https://developers.google.com/web/fundamentals/performance/http2, dated Jul. 31, 2019, in 25 pages.

* cited by examiner

CONFIGURATION OF EVENT DATA COMMUNICATION IN COMPUTER NETWORKS

RELATED APPLICATIONS

Any and all applications for which a domestic priority claim is identified in the Application Data Sheet of the present application are hereby incorporated by reference under 37 CFR 1.57.

BACKGROUND

Some operators of applications regularly obtain the results of analytics performed with regard to actions on their applications. Analytics can be used to understand the behaviors or uses of the applications.

SUMMARY

In some embodiments, a system is disclosed for processing event data for an application and transmitting the event data via a computer network. The system can include a memory device and a hardware processor. The memory device can store an application. The hardware processor can be in communication with the memory device. The hardware processor can: execute the application; characterize a user engagement with the application as being a first level of engagement or a second level of engagement; generate first event data responsive to first user interactions with the application during a first time period; determine that the user engagement with the application at a first time is characterized as the first level of engagement; responsive to determining that the user engagement with the application at the first time is characterized as the first level of engagement: batch collect the first event data, and transmit first reporting data to a computing device via a computer network, the first reporting data being responsive to the first event data; generate second event data responsive to second user interactions with the application during a second time period different from the first time period; determine that the user engagement with the application at a second time different from the first time is characterized as the second level of engagement; and responsive to determining that the user engagement with the application at the second time is characterized as the second level of engagement: limit batch collection of the second event data more than batch collection of the first event data is limited, and transmit second reporting data to the computing device via the computer network, the second reporting data being responsive to the second event data.

The system of the preceding paragraph can include one or more of the following features: The hardware processor can characterize the user engagement according to a number of user interactions with the application, a frequency of user interactions with the application, or a duration of use of the application by a user. The hardware processor can continue to batch collect the first event data while the hardware processor is able to transmit to the computing device via the computer network. The first reporting data can indicate that the first event data was batched for optimization purposes rather than due the hardware processor being unable to transmit to the computing device via the computer network. The hardware processor can, responsive to determining that the user engagement with the application at the second time is characterized as the second level of engagement, not batch collect the second event data. The hardware processor can: identify duplicate data in the first event data and remove the duplicate data from the first event data to generate the first reporting data; or compress the first event data to generate the first reporting data.

In some embodiments, a method is disclosed for processing event data for an application and transmitting the event data via a computer network. The method can be performed under control of a hardware processor of a physical computing device. The method can include: executing an application; characterizing a user engagement with the application at a first time as being a first level of engagement; generating first event data responsive to a first plurality of user interactions with the application; responsive to characterizing the user engagement with the application at the first time as being the first level of engagement, transmitting first reporting data to a computing device via a computer network subsequent to collecting the first event data, the first reporting data being responsive to the first event data; characterizing the user engagement with the application at a second time as being a second level of engagement; generating second event data responsive to a second plurality of user interactions with the application, the second plurality of user interactions comprising fewer user interactions than the first plurality of user interactions; and responsive to characterizing the user engagement with the application at the second time as being the second level of engagement, transmitting second reporting data to the computing device via the computer network subsequent to collecting the second event data.

The method of the preceding paragraph can include one or more of the following features: The user engagement with the application at the first time can be characterized as being the first level of engagement from a comparison of a first engagement metric for the first time to an engagement threshold, and the user engagement with the application at the second time can be characterized as being the second level of engagement from a comparison of a second engagement metric for the second time to the engagement threshold. The user engagement with the application at the first time can be characterized as being the first level of engagement due to a number of user interactions with the application or a frequency of user interactions with the application. The user engagement with the application at the first time can be characterized as being the first level of engagement due to a duration of use of the application by a user over a time period. The method can include adjusting, responsive to a user input, a condition for causing the first reporting data to be transmitted. The method can include adjusting, responsive to a metric associated with a power supply for the hardware processor, a condition for causing the first reporting data to be transmitted. The method can include adjusting, responsive to a type of data included in the first event data, a condition for causing the first reporting data to be transmitted. The method can include generating the first reporting data from the first event data by removing duplicate data from the first event data or compressing the first event data. The method can include detecting, via a user interface of the physical computing device, the first plurality of user interactions and the second plurality of user interactions.

In some embodiments, non-transitory physical computer storage is disclosed that includes computer-executable instructions stored thereon that, when executed by one or more processors, are configured to implement a process. The process can include: executing an application; characterizing a user engagement with the application at a first time as being a first level of engagement; generating first event data responsive to a first plurality of user interactions with the application; responsive to characterizing the user engagement with the application at the first time as being the first level of engagement, transmitting first reporting data to a computing device via a computer network subsequent to collecting the first event data, the first reporting data being responsive to the first event data; characterizing the user engagement with the application at a second time as being a second level of engagement; generating a first subset of second event data responsive to a second plurality of user interactions with the application, the second plurality of user interactions comprising fewer user interactions than the first plurality of user interactions; generating a second subset of the second event data responsive to a third plurality of user interactions with the application; and responsive to characterizing the user engagement with the application at the second time as being the second level of engagement, transmitting second reporting data to the computing device via the computer network prior to collecting the second subset of the second event data, the second reporting data being responsive to the first subset of the second event data.

The non-transitory physical computer storage of the preceding paragraph can include one or more of the following features: The user engagement with the application at the first time can be characterized as being the first level of engagement due to a number of user interactions with the application, a frequency of user interactions with the application, or a duration of use of the application by a user over a time period. The first plurality of user interactions can include a plurality of user selections of elements of the application. The process can include adjusting, responsive to a metric associated with a power supply for the one or more processors or a type of data included in the first event data, a condition for causing the first reporting data to be transmitted. The process can include generating the first reporting data from the first event data by removing redundant data from the first event data or compressing the first event data.

In some embodiments, a system is disclosed for processing event data for an application and transmitting the event data via a computer network. The system can include a memory device and a hardware processor. The memory device can store an application. The hardware processor can be in communication with the memory device. The hardware processor can: execute the application; generate first event data responsive to first actions associated with the application during a first time period; transmit, according to first event processing rules, first reporting data to a computing device via a computer network, the first reporting data being responsive to the first event data; generate second event data responsive to second actions associated with the application during a second time period different from the first time period; determine second event processing rules from a message received via the computer network, the second event processing rules being different from the first event processing rules; and transmit, according to the second event processing rules, second reporting data to the computing device via the computer network, the second reporting data being responsive to the second event data.

The system of the preceding paragraph can include one or more of the following features: The hardware processor can transmit to the computing device according to the first event processing rules prior to the hardware processor receiving the message. The first event data can be indicative of at least (i) a first event denoting a transition from not executing the application to executing the application, (ii) a second event denoting a collection of sensor data by a sensor, or (iii) a third event denoting a selection of an element of the application by a user, and the second event data can be indicative of at least (i) the first event, (ii) the second event, or (iii) the third event. The first event data can be indicative of at least two of the first event, the second event, or the third event, and the second event data can be indicative of at least two of the first event, the second event, or the third event. The system can include a communication interface configured to communicate via the computer network and a power supply configured to power the hardware processor and the communication interface. Operation of the hardware processor according to the second event processing rules can reduce a power consumption of the power supply relative to operation of the hardware processor according to the first event processing rules. Operation of the hardware processor according to the second event processing rules can reduce a utilization of the computer network by the hardware processor relative to operation of the hardware processor according to the first event processing rules. The hardware processor can process and communicate according at least to a protocol, such as a HyperText Transfer Protocol™ (HTTP).

In some embodiments, a method is disclosed for processing event data for an application and transmitting the event data via a computer network. The method can be performed under control of a hardware processor of a physical computing device. The method can include: executing an application; generating first event data responsive to first actions associated with the application during a first time period; transmitting, according to first event processing rules, first reporting data to a computing device via a computer network, the first reporting data being responsive to the first event data; subsequent to transmitting the first reporting data to the computing device via the computer network, determining second event processing rules from a first message received via the computer network, the second event processing rules being different from the first event processing rules; generating second event data responsive to second actions associated with the application during a second time period different from the first time period; and transmitting, according to the second event processing rules, second reporting data to the computing device via the computer network, the second reporting data being responsive to the second event data.

The method of the preceding paragraph can include one or more of the following features: The second event data can be indicative of at least an event denoting collection of sensor data by a sensor. The method can include: generating the first reporting data from the first event data by removing redundant data from the first event data or compressing the first event data; and generating the second reporting data from the second event data by removing redundant data from the second event data or compressing the second event data. The first event data can include first event attributes and associated first event values, and the second event data can include second event attributes and associated second event values, the second event attributes being different from the first event attributes. The method can include changing the second event processing rules according to a user input. The method can include changing the second event processing rules according to the second event data. The method can include generating and transmitting a second message via the computer network, the second message requesting adjustment of the first event processing rules. The first event data and the second event data can be generated by one or more listeners configured to respond to one or more events associated with the application.

In some embodiments, non-transitory physical computer storage is disclosed that includes computer-executable instructions stored thereon that, when executed by one or more processors, are configured to implement a process. The process can include: executing an application; generating first event data responsive to first actions associated with the application during a first time period; transmitting, according to first event processing rules, first reporting data to a computing device via a computer network, the first reporting data being responsive to the first event data; subsequent to transmitting the first reporting data to the computing device via the computer network, determining second event processing rules from a first message received via the computer network, the second event processing rules being different from the first event processing rules; generating second event data responsive to second actions associated with the application during a second time period different from the first time period; and transmitting, according to the second event processing rules, second reporting data to the computing device via the computer network, the second reporting data being responsive to the second event data.

The non-transitory physical computer storage of the preceding paragraph can include one or more of the following features: The second event data can be indicative of at least an event denoting selection of an element of the application by a user. The process can include generating a second message and transmitting the second message via the computer network, the second message indicating one or more attributes not transmitted according to the second event processing rules. The second event processing rules can include a first rule option and a second rule option, the first rule option being associated with a first operating condition for the application and the second rule option being associated with a second operating condition different from the first operating condition for the application. The process can include: determining that one or more operations of the application are indicative of the first operation condition; and transmit the second reporting data to the computing device via the computer network according to the first rule option rather than the second rule option. The second reporting data can be transmitted as part of a second message formatted according to a protocol, such as a HyperText Transfer Protocol™ (HTTP).

In some embodiments, a system is disclosed for controlling reporting of event data for an application via a computer network. The system can include a hardware processor and a memory device. The hardware processor can: determine first event processing rules for a first electronic device and second event processing rules for a second electronic device, the first event processing rules being different from the second event processing rules and configured to control reporting of first event data associated with first actions of a first application running on the first electronic device, the second event processing rules being configured to control reporting of second event data associated with second actions of a second application running on the second electronic device; generate a first message for indicating the first event processing rules to the first electronic device and a second message for indicating the second event processing rules to the second electronic device; and transmit, via a computer network, the first message to the first electronic device and the second message to the second electronic device so that the first electronic device implements the first event processing rules for reporting the first event data and the second electronic device implements the second event processing rules for reporting the second event data. The memory device can be in communication with the hardware processor. The memory device can store the first event processing rules and the second event processing rules.

The system of the preceding paragraph can include one or more of the following features: The hardware processor can: responsive to a first metric associated with implementation of the first event processing rules by the first electronic device and a second metric associated with implementation of the second event processing rules by the second electronic device, revise the first event processing rules to obtain revised first event processing rules; generate a third message for indicating the revised first event processing rules to the first electronic device; and transmit, via the computer network, the third message to the first electronic device so that the first electronic device implements the revised first event processing rules. The hardware processor can: determine the first event processing rules for the first electronic device from a first group in which the first electronic device is assigned; and determine the second event processing rules for the second electronic device from a second group in which the second electronic device is assigned, the second group being different from the first group. The first group can be a test group, and the second group can be a control group. The hardware processor can determine the first event processing rules to reduce a power consumption by the first electronic device. The hardware processor can determine the first event processing rules to reduce a network utilization by the first electronic device. The first actions can include (i) a transition from the first electronic device not running the first application to running the first application, (ii) a collection of sensor data from a sensor, or (iii) a user interaction with the first application. The hardware processor can: receive a third message via the computer network, the third message indicating a requested adjustment of the first event processing rules; and revise, based at least on the requested adjustment, the first event processing rules to obtain revised first event processing rules. The first event processing rules can include a first rule option and a second rule option, the first rule option being associated with a first operating condition for the first application and provided for selection by the first electronic device when a determined operating condition for the first application matches the first operating condition, the second rule option being associated with a second operating condition for the first application different from the first operating condition and provided for selection by the first electronic device when the determined operating condition for the first application matches the second operating condition.

In some embodiments, a method is disclosed for controlling reporting of event data for an application via a computer network. The method can be performed under control of a hardware processor. The method can include: determining first event processing rules for a first electronic device and second event processing rules for a second electronic device, the first event processing rules being different from the second event processing rules and configured to control reporting of first event data associated with first actions of a first application running on the first electronic device, the second event processing rules being configured to control reporting of second event data associated with second actions of a second application running on the second electronic device; generating a first message for indicating the first event processing rules to the first electronic device and a second message for indicating the second event processing rules to the second electronic device; and transmitting, via a computer network, the first message to the first electronic device and the second message to the second electronic device so that the first electronic device implements the first event processing rules for reporting the first event data and the second electronic device implements the second event processing rules for reporting the second event data.

The method of the preceding paragraph can include one or more of the following features: The method can include: comparing a metric associated with implementation of the first event processing rules by the first electronic device and a threshold; responsive to said comparing, revise the first event processing rules to obtain revised first event processing rules; generating a third message for indicating the revised first event processing rules to the first electronic device; and transmitting, via the computer network, the third message to the first electronic device so that the first electronic device implements the revised first event processing rules. The determining can include determining the first event processing rules to adjust a power consumption and a network utilization by the first electronic device. The method can include: comparing a first batching of events by the first electronic device due to an optimized collection and a second batching of events by the first electronic device due to an offline communication status of the first electronic device; responsive to said comparing, revise the first event processing rules to obtain revised first event processing rules; generating a third message for indicating the revised first event processing rules to the first electronic device; and transmitting, via the computer network, the third message to the first electronic device so that the first electronic device implements the revised first event processing rules. The method can include: receiving a third message from the first electronic device indicating one or more exclusions from reporting of the first event data; determining from the one or more exclusions to revise the first event processing rules to obtain revised first event processing rules; generating a fourth message for indicating the revised first event processing rules to the first electronic device; and transmitting, via the computer network, the third message to the first electronic device so that the first electronic device implements the revised first event processing rules. The determining can include determining the first event processing rules from a metric associated with the first electronic device and a rule model. The determining can include determining the first event processing rules with a machine learning algorithm.

In some embodiments, non-transitory physical computer storage is disclosed that includes computer-executable instructions stored thereon that, when executed by one or more processors, are configured to implement a process. The process can include: determining first event processing rules for a first electronic device and second event processing rules for a second electronic device, the first event processing rules being different from the second event processing rules and configured to control reporting of first event data associated with first actions of a first application running on the first electronic device, the second event processing rules being configured to control reporting of second event data associated with second actions of a second application running on the second electronic device; generating a first message for indicating the first event processing rules to the first electronic device and a second message for indicating the second event processing rules to the second electronic device; and transmitting, via a computer network, the first message to the first electronic device and the second message to the second electronic device so that the first electronic device implements the first event processing rules for reporting the first event data and the second electronic device implements the second event processing rules for reporting the second event data.

The non-transitory physical computer storage of the preceding paragraph can include one or more of the following features: The process can include: comparing a first metric associated with implementation of the first event processing rules by the first electronic device and a first threshold; comparing a second metric associated with implementation of the second event processing rules by the second electronic device and a second threshold; responsive to said comparing the first metric, revise the first event processing rules to obtain revised first event processing rules; responsive to said comparing the second metric, revise the second event processing rules to obtain revised second event processing rules; generating a third message for indicating the revised first event processing rules to the first electronic device; generating a fourth message for indicating the revised second event processing rules to the second electronic device; and transmitting, via the computer network, the third message to the first electronic device and the fourth message to the second electronic device so that the first electronic device implements the revised first event processing rules and the second electronic device implements the revised second event processing rules. The first actions can include (i) a transition from the first electronic device not running the first application to running the first application, (ii) a collection of sensor data from a sensor, or (iii) a user interaction with the first application. The process can include: receiving a user input via the computer network; responsive to the user input, revise the first event processing rules to obtain revised first event processing rules; generating a third message for indicating the revised first event processing rules to the first electronic device; and transmitting, via the computer network, the third message to the first electronic device so that the first electronic device implements the revised first event processing rules.

BRIEF DESCRIPTION OF THE DRAWINGS

Throughout the drawings, reference numbers are re-used to indicate correspondence between referenced elements. The drawings are provided to illustrate aspects of the features described herein and not to limit the scope thereof.

DETAILED DESCRIPTION

I. Introduction

Figure 1:
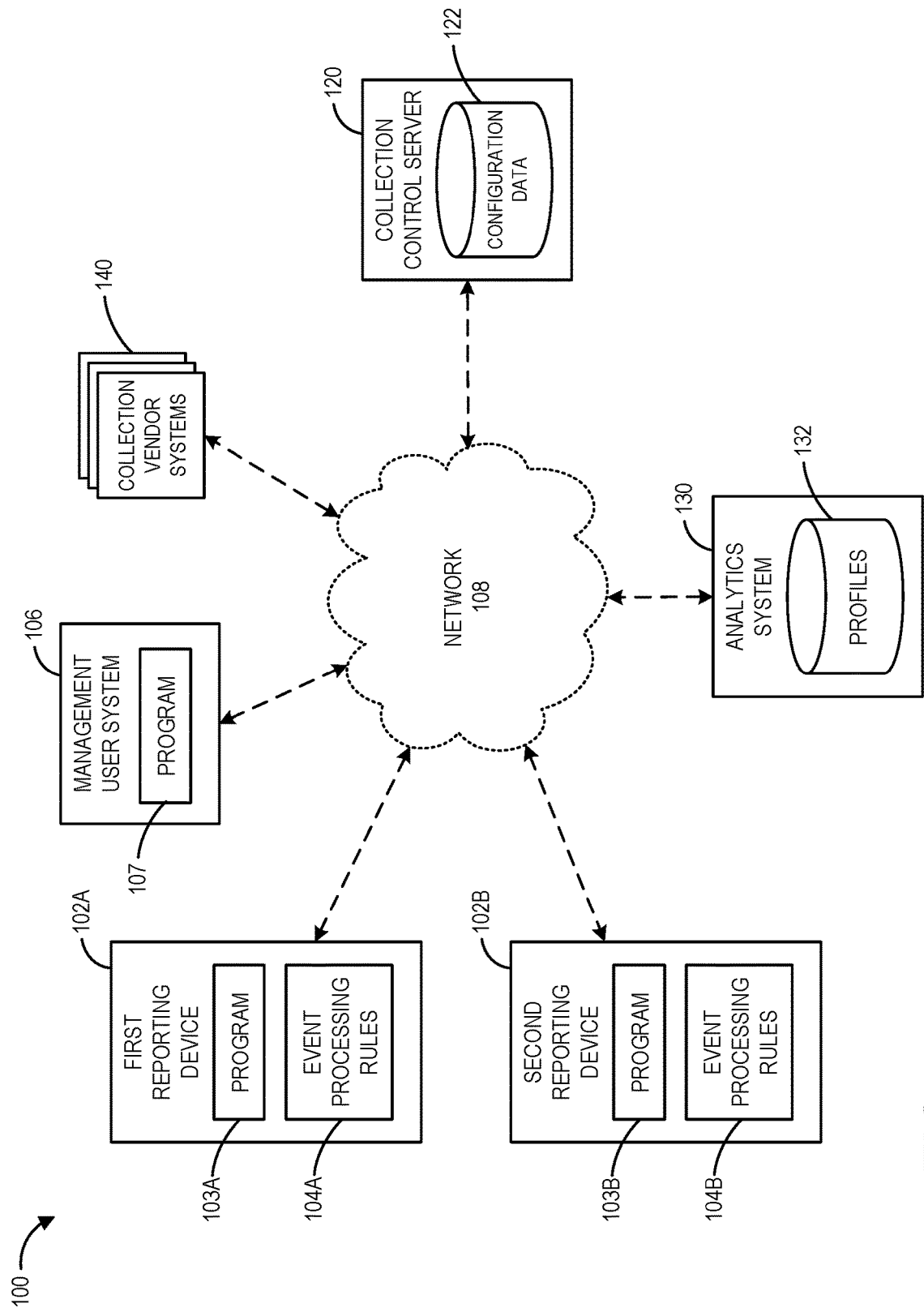
FIG. 1 depicts an example computing environment for managing the collection of event data.

An electronic device, such as a mobile phone or an Internet of things (IoT) device, can collect event data and report the event data via a computer network. The event data may be indicative of actions associated with a program running on the electronic device. The event data can be usable to understand a behavior or performance of the program.

The collection and reporting of event data by the electronic device can be performed in a way that optimizes the collection or reporting in view of uses of the electronic device or conditions or environments in which the electronic device may be operating. For example, the electronic device can determine to batch collect and report event data responsive to a user engagement with a program running on the electronic device, so the collection and reporting can be performed to reduce or minimize a power consumption or network utilization by the program.

The electronic device can collect or report event data according to event processing rules, which may be stored locally on the electronic device. The event processing rules may be determined or revised by the electronic device or determined or revised according to instructions from a configuration device, such as a collection control server.

In implementations where event processing rules are determined or revised according to the instructions from the configuration device, the instructions from the configuration device may differ from instructions that the configuration device provided to a different electronic device. The differences between the instructions for the two electronic devices can facilitate the creation and control of collection or reporting for different groups of electronic devices (such as a control group and a test group), which can be useful for optimization or testing of different collection or reporting configurations.

An aspect of at least one of the inventions disclosed herein includes the realization that there can be a tradeoff between (i) an accuracy or a timeliness of event data collection or reporting by an electronic device and (ii) a power consumption or network utilization by the electronic device. In computing systems or environments with limited resources, such as a limited power supply capacity or a limited communication channel bandwidth or availability, the collection and reporting of event data by the electronic device can be adjusted so that power consumption or network utilization may be reduced while ensuring a sufficient accuracy or timeliness of the event data collection and reporting.

II. Overview

Event data can be batched (for example, collected for sending at a later time or the same time) for various reasons. When an electronic device goes offline, event data may be batched by collecting the event data and queuing the event data at the electronic device until the electronic device goes back online. The electronic device may go offline for a short duration (for instance, while driving through a zone in which cell phone service is unavailable) or a long duration (for instance, while on an airplane with no computer network communication services available). The event data can be batched to into multiple batches so that individual batches may be designated for transmission to one or more particular recipient devices. Upon transitioning from offline to online, the event data that has been batched can be sent one event at a time or multiple events as a group. Additionally or alternatively, event data can be batched in order to save power or reduce network utilization by an electronic device or to optimize performance or communication in a computer system.

Event data that has been batched can be compressed, such as to remove redundant data so that the data, after compression, contains unique data. The unique data may correspond to a single event or multiple events. Because event attributes of event data may be shared for a single event or related events, some of the event attributes of the event data may be redundant, grouped together into a single object, and then the redundant data can be subtracted from the group. For example, an event may have an "App ID" (or Device ID) that may be used to associate the event to an application. The App ID may not be repeated 100 times and can instead be provided once (such as at the top) of a batch of data. The receiver of a payload (which can be or include the compressed, batched data) can apply the App ID to all events in the payload and send the events through for further processing or storage. This can provide compression on the client-side and decompression on the server-side. If around 50% of the event attributes are common across batched events, then a total compression can be around 50%. This compression can permit sending of event data for more events in a single payload or a reduction in size (for instance, kilobytes) of the network payload (which can result in network requests that may be quicker and less taxing on limited resources, such as a power source like a battery). One or more other forms of compression may be used, such as a lossless file compression using the software application gzip (that may perform adaptive Lempel-Ziv coding). Whether compression is performed may depend on a size (for instance, kilobytes) of a payload.

Additionally or alternatively, event data that has been batched can be filtered, such as to remove event attributes that may be deemed unnecessary, no-longer-important, or of limited value. For example, if a video is streamed and watched in real-time, a pulse may be communicated every 15 seconds to track a progress of the video. However, if a video is saved and watched offline and event data associated with the video may be batched, the pulse may no longer be valuable and may not be tracked or may be filtered from batched event data, but other events (such as "play" events, "pause" events, or "last location of the video seen" events) may be tracked. As another example, a mobile application can include multiple screens, which may assist a user through a multiple step process, such as a check-out process for purchasing an item. When the mobile application is online, event data can be collected in real-time to track every single interaction with the mobile application. However, if the mobile application is offline, the usability or value of the event data may be considered when tracking or reporting (such as by not tracking or reporting intermediate state event data in view of tracking and reporting final state event data). For instance, the selection of drop-downs by a user may be less relevant or interesting while an indication that the user navigated to step 4 of 5 may be particularly relevant or interesting (as one example, because the user navigated to step 4 of 5, any problem that the user had at step 3 of 5 can be less relevant or interesting because any problem may have necessarily been overcome to successfully arrive at step 4 of 5). The collection or reporting can be adjusted to not collect or report less relevant or interesting data and ensure collecting or reporting is performed for particularly relevant or interesting data.

Additionally or alternatively, event data that has been batched can be batched and reported to reduce a number of outgoing communications, such as unique HyperText Transfer Protocol™ (HTTP) requests. The timing for reporting the batched event data can depend on one or more factors, such as an urgency of data (for instance, urgent event data may batch for a shorter period of time before reporting than non-urgent event data), a count of total events (for instance, batched event data may be reported after a threshold number of total events are batched), a wait time (for instance, event data may be batched for a set period of time and then reported), a user engagement (for instance, typical actions of a user of an application can be used to determine whether to wait for batching of additional event data or instead to report the already-batched event data), an application behavior (for instance, typical actions of an application can be used to determine whether to wait for batching of additional event data or instead to report the already-batched event data), a power source characteristic (for instance, a remaining battery life), or configuration settings. The timing for reporting the batched event data can vary over time or be user configurable (such as by permitting a user to adjust one or more batch configuration thresholds). As one example, if a user typically launches an application once per day and engages with the application a limited amount, event data for the application may not be batched and may be reported one event at a time; on the other hand, if the user typically launches the application and then preforms four screen views immediately thereafter, event data may be batched and reported so that batched, reported event data includes data for the launch and screen view events.

Multiple factors may influence collection or reporting of event. One factor can be how often event data may be utilized for an action or insight. For example, an IoT fire alarm may report data every second because action may desirably be taken immediately upon detection of an event by the IoT fire alarm. As another example, an IoT tide monitor or humidity reader may report data every hour because data values collected by the IoT tide monitor or humidity reader may typically vary slowly or the data values may not be urgently utilized. As yet another example, a frequently-used mobile application can report data in real-time or store events, filter some events, or determine what may be interesting to report each day or at each application launch. Another factor can be whether data may be collect from some or all users or devices. For example, some A/B testing tools may implement an experiment with 1% of users or devices. As another example, particular data may be collected for all users, but a test may be run 1% of the time for the users or devices. Yet another factor can be what specific data may be interesting or useful. For instance, with use of machine learning, insights can be fed back to an application or electronic device to determine that (i) sufficient data may have already been collected or (ii) no downstream users are using certain collected data so collection of the certain data may be stopped. An additional factor can be what may be efficient for specific user behaviors. For example, a user who typically opens a social media application every 5 minutes throughout the data may generate event data differently (such as to batch less or report more frequently) from a user who typically opens their social media application for 30 minutes in the evening. While both situations may benefit from optimized collection or reporting, the optimized collection or reporting may vary for the different users.

Variation in event data collection or reporting can be controlled at least using a frequency, filtering, or threshold. For frequency, for instance, control can be such that event data may be reported (i) at least once per minute, hour, day, week, month etc., (ii) during a specific window of time such as at the end of each day or the first thing on a following day, or (iii) immediately when the event data matches a filter rule. For filtering, for example, control can be such that (i) events in a particular category may be ignored, (ii) events from a particular user may be ignored, (iii) events of a particular type can be ignored, (iv) filtering may not be performed for a particular user such as if the particular user may be part of a sample or control group, (v) offline events may be ignored, or (vi) events older than a period of time such as 24 hours may be ignored or discarded. For threshold, for instance, control can be such that (i) a maximum number of events are included in a single batch, (ii) a batch has a maximum total payload size, or (iii) an optimum number of event may be included in a single batch.

The variations described in the preceding paragraph can be combined as illustrated by the following examples. For instance, X events can be collected at a time unless it has been over Y minutes (then collect fewer than X events), which can be described as having a threshold of X events with a minimum frequency of every Y minutes. As another example, event data can be sent at the end of each day unless a payload size exceeds a maximum size setting (event data may be sent immediately when the threshold for the maximum size setting is met). As yet another example, if an electronic device may be online, an entire queue or a single event can be sent immediately when an application determines that an event payload contains an event attribute called "order_id" or "control_group : true" (which can be deemed to be associated with high priority event data).

Limited memory capacity (for instance, kilobytes) may be available to queue event data in some electronic devices, such as certain IoT devices. To address this limitation, event data collection or reporting can be controlled according to the capacity of a device memory. For example, if an average payload may have a size of 2 kB and the device memory can have a capacity of 100 kB, a maximum number of batched events may be around 50 events. In situations where events may vary significantly in size from one to another or network availability (for instance, online access time) may be limited, a threshold may be set for triggering an end of batching and reporting of the batch. The threshold can be determined using an algorithm, artificial intelligence, or machine learning. If an electronic device were online 99% of the time, the electronic device may batch up to 90 kB of event data before reporting; if an electronic device were online 40% of the time, the electronic device may batch up to 25 kB of event data before reporting to ensure that event data can reported when the electronic device is online.

A payload for reporting event data generated by an electronic device may indicate whether an event or an event attribute was added to the payload due to the electronic device being offline or due to event processing rules. The indication can be used, such as server-side or client-side, to understand a percentage of events that may occur due to the electronic device being offline or the event processing rules. For example, an IoT device may turn on at the end of each day for a short period of time and may otherwise be turned off. As a result, 99% of events can be batched due to an offline state. A machine learning algorithm may determine when the IoT device is in an online state and when to report event data.

Client-side or server-side devices can determine a cost for optimization (such as processing time, delay, or network utilization) relative to a benefit for optimization (such as how much collection or reporting may be saved per application or per period of time). To facilitate determination of this information, some client devices may be assigned to a control group while other client devices may be assigned to a separate test group. For instance, the client devices in the control group may not be optimized and may operate under simple event processing rules, and the client devices in the test group may be optimized and operate under more complex or sophisticated event processing rules. A comparison of the performance of the client devices in the control group versus the test group or some comparison of other associated behaviors or performance in a computing system (such as historical data or trends) can be used to make the determination.

The features disclosed herein may, in certain aspects, provide advantages including a more efficient usage of limited client-side resources while still permitting sufficient collection of event data. For example, network communication can consume a significant amount of power or processing resources, so optimized or efficient network communication can improve the use of power or processing resources and may minimize an impact on power or processing resources. This may further have server-side benefits as a server that receives event data from a client device can receive less event data to process.

The features disclosed herein may, in certain aspects, provide advantages including a consolidation of cost-generating events. For example, if a charge-per-event fee is in place for tracking and reporting events at an electronic device, one or more of the features may eliminate tracking or reporting of some events and thus reduce a total cost incurred for the charge-per-event fees. As another example, one or more of the features can result in fewer server-side events that may be processed, which can save on processing costs that may be passed on to a client. The fewer server-side events can further have downstream impacts because one or more vendors that may receive and process the fewer server-side events may, in turn, end up processing fewer events and further reduce processing costs. As yet another example, one or more features can result in smaller payloads (for instance, in kilobytes), which can be reduced costs for infrastructure to facilitate communication that may change based on a total amount of data transferred.

For purposes of summarizing the disclosure, certain aspects, advantages and novel features are described herein. It is to be understood that not necessarily all such advantages can be achieved in accordance with any particular aspect disclosed herein. Thus, the aspects disclosed herein can be embodied or carried out in a manner that achieves or optimizes one advantage or group of advantages as taught herein without necessarily achieving other advantages as may be taught or suggested herein.

III. Event Reporting Systems and Methods

FIG. 1 illustrates a computing environment 100 for implementing various event reporting features, including some or all of the event reporting features described herein. In the computing environment 100, a first reporting device 102A and a second reporting device 102B can communicate over a network 108 with a collection control server 120, an analytics system 130, and collection vendor systems 140. The first reporting device 102A and the second reporting device 102B can each include any form of computing device and may be a desktop, laptop, smartphone, tablet, IoT device (such as a sensor device, meter device, security device, smart television, toy, wearable, or appliance, which may have a relatively low power capability or limited battery capacity), or the like.

A program 103A, such as a browser or an application software (such as a native application or a progressive web application) stored on the first reporting device 102A, can upon execution provide functionality to the first reporting device 102A or control functionality of the first reporting device 102A. As one example, the program 103A can facilitate understanding or communication of information by a user of the first reporting device 102A. As another example, the program 103A can facilitate the collection of sensor data by a sensor or provide a control signal to adjust operation of another device.

The program 103A can collect and report data indicative of actions associated with the program 103A. The actions can, for instance, include a launching or closing of the program 103A, collections of sensor data by the program 103A, or user interactions with the program 103A. The collection or reporting of data by the program 103A can be controlled according at least to event processing rules 104A stored on the first reporting device 102A and may be managed through a data collection library. The program 103A can process or communicate according to one or more protocols, such as a HTTP.

The second reporting device 102B can include a program 103B and event processing rules 104B. The program 103B can be similar to or the same as the program 103A. The event processing rules 104B can be similar to or the same as the event processing rules 104A at least in that the event processing rules 104B can be used to control the collection or reporting of data by the program 103B and may be stored on the second reporting device 102B.

The network 108 can include a local area network (LAN), a wide area network (WAN), a company intranet, the public Internet, combinations of the same, or the like.

A collection control server 120 can include a configuration data storage 122 that may store configuration data for other devices, such as the first reporting device 102A and the second reporting device 102B. The collection control server 120 can determine the configuration data from analyzing behavior or actions of the program 103A, the program 103B, the first reporting device 102A, or the second reporting device 102B or from analyzing traffic or data communicated on the network 108. The configuration data can include processing rules, such as the event processing rules 104A and the event processing rules 104B, or indications thereof for the first reporting device 102A and the second reporting device 102B.

The collection control server 120 can transmit or receive messages via the network, such as to or from the first reporting device 102A and the second reporting device 102B. For instance, the collection control server 120 can transmit a message to one or both of the first reporting device 102A and the second reporting device 102B providing the event processing rules 104A or the event processing rules 104B or indications of the event processing rules 104A or the event processing rules 104B. The first reporting device 102A and the second reporting device 102B may respectively implement the event processing rules 104A and the event processing rules 104B, such as part of rules engines, upon receipt.

The program 103A can report collected data to an analytics system 130 or collection vendor systems 140 and may optionally report through the collection control server 120. The collection control server 120 and the analytics system 130 can be implemented in computer hardware or software. The collection control server 120 can moreover be part of the analytics system 130 in some aspects.

The analytics system 130 can enable management users to configure the data collected or reported by other devices, such as the first reporting device 102A and the second reporting device 102B, as well as to analyze and report on gathered data. The analytics system 130 can provide one or more user interfaces that enable customization of information monitored about actions associated with the one or more programs, such as the program 103A and the program 103B. This customization can be enabled through communication with and configuration of the collection control server 120.

The collected data reported by the first reporting device 102A and the second reporting device 102B can be supplied to the analytics system 130 (optionally through the collection control server 120) and stored in user, device, or application profiles in a profiles storage 132. Management users can subsequently query the user, device, or application profiles to obtain reports or other information about users, devices, or applications. These reports or other information can be used for obtaining analytics for data analysis or business intelligence, tracking activity with respect to a program, obtaining user data for developing and releasing program updates, obtaining user data for customizing functionality or campaigns targeted to users, obtaining data for personalizing content or behavior, obtaining data for integration with social networking functionality, obtaining data for big data analysis, combinations of the same, or the like.

Data obtained by the collection vendor systems 140 can be used to perform similar or the same types of processing as described with respect to the analytics system 130. The collection vendor systems 140, however, may be a third-party entity relative to the supplier or manager of the analytics system 130, as well as the program 103A, the event processing rules 104A, or the first reporting device 102A. The collected data reported by the first reporting device 102A and the second reporting device 102B (or a subset of the collected data) can be transmitted directly to the collection vendor systems 140 or by or through the collection control server 120 or the analytics system 130.

A management user system 106 can access the collection control server 120 or the analytics system 130 via the network 108. The management user system 106 can include a program 107, such as an application software or browser, which can access network applications over the network 108. The management user system 106 can be any type of computing device including, but not limited to, a desktop, laptop, tablet, smartphone, or the like. The management user system 106 can be operated by management users such as marketing professionals, website operators, application developers, business users, operators of the collection control server 120 or the analytics system 130, or any other individual who designs or manages content or applications for reporting devices or data obtained therefrom. The management users can use the management user system 106 to communicate with the collection control server 120 or the analytics system 130 to change the data collected, reported, or analyzed for the first reporting device 102A or the second reporting device 102B. Management users may not be the end users of reporting devices like the first reporting device 102A or the second reporting device 102B.

The computing environment 100 can additionally include more reporting devices and management user systems than just the first reporting device 102A, the second reporting device 102B, and the management user system 106 shown in FIG. 1. More than two reporting devices can thus collect and report data via the network 108, and multiple management user systems can interact with the analytics system 130 via the network 108.

Figure 2:
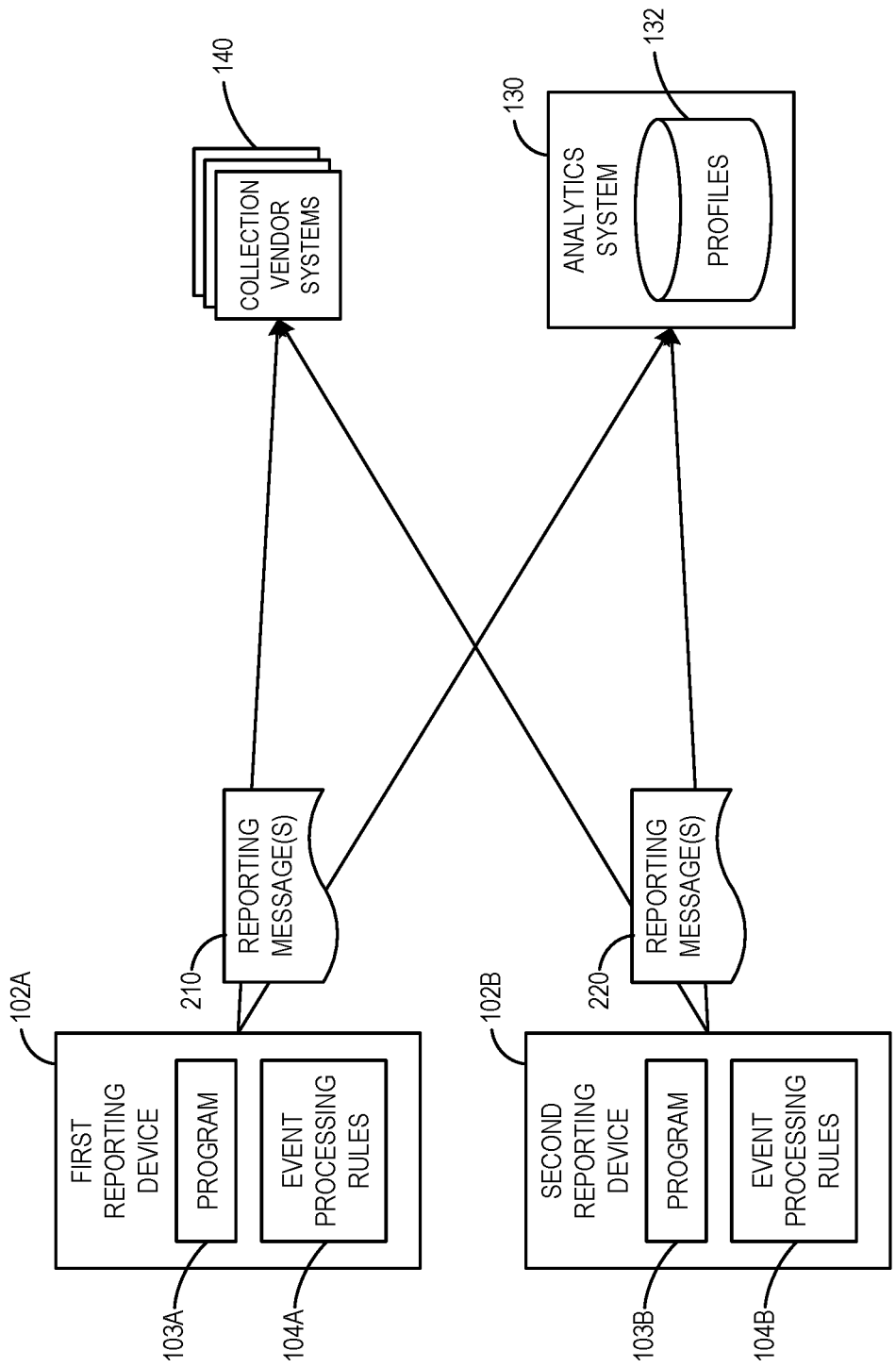
FIGS. 2 and 3 illustrate example communications in the computing environment of FIG. 1.

Turning to FIG. 2, communications from the first reporting device 102A and the second reporting device 102B to the analytics system 130 and the collection vendor systems 140 are shown. In particular, the first reporting device 102A is illustrated as transmitting reporting message(s) 210 to the analytics system 130 and the collection vendor systems 140, and the second reporting device 102B is illustrated as transmitting reporting message(s) 220 to the analytics system 130 and the collection vendor systems 140. The analytics system 130 and the collection vendor systems 140 can, in turn, receive the reporting message(s) 210 or the reporting message(s) 220 and process the data included therein, such as to understand uses or behaviors of the first reporting device 102A, the second reporting device 102B, or the network 108.

The reporting message(s) 210 can include data, such as event data, which may be indicative of actions associated with the program 103A. The actions can include one or more state transitions performed by the program 103A (such as launching, minimizing, entering power save mode, or closing), one or more data values collected by a sensor monitored with the program 103A (such as temperature, humidity, or pressure readings by an environmental sensor of or in communication with the first reporting device 102A) or indications of the collection of the data value (such as confirmations of collected data or a quantity of collected data), or one or more user interactions with the program 103A or the first reporting device 102A (such as particular selections or other actions performed by a user), among other possibilities. The collection of data or transmission of the reporting message(s) 210 by the program 103A can be performed according at least to the event processing rules 104A.

One of the reporting message(s) 210 transmitted to the analytics system 130 can be similar to, the same as, or different from one of the reporting message(s) 210 transmitted to the collection vendor systems 140. The one of the reporting message(s) 210 transmitted to the analytics system 130 can accordingly include data indicative of similar, the same, or different actions relative to the one of the reporting message(s) 210 transmitted to the collection vendor systems 140. In one example, the one of the reporting message(s) 210 transmitted to the analytics system 130 can include data customized to provide inputs for the specific analysis functions performed by the analytics system 130 while the one of the reporting message(s) 210 transmitted to the collection vendor systems 140 can include data customized to provide inputs for the specific analysis functions performed by collection vendor systems 140.

The reporting message(s) 220 can be similar to or the same as the reporting message(s) 210 in that the reporting message(s) 210 can include data, such as event data, which may be indicative of actions associated with the program 103B. The reporting message(s) 220 may thus serve a similar reporting function as the reporting message(s) 210 but may provide information for the program 103B rather than the program 103A. The collection of data or transmission of the reporting message(s) 220 by the program 103B can similarly be performed according at least to the event processing rules 104B.

Figure 3:
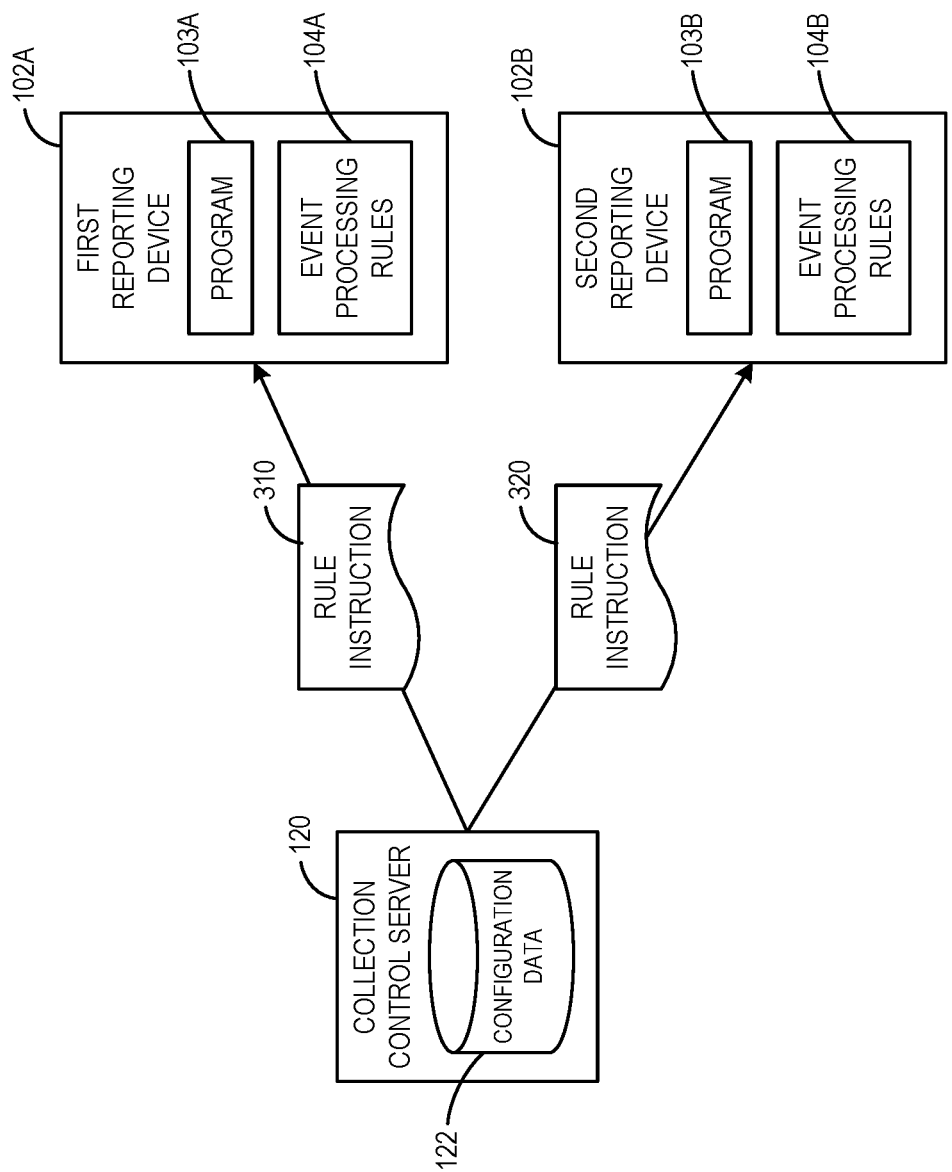

FIG. 3 illustrates communications from the collection control server 120 to the first reporting device 102A and the second reporting device 102B. In particular, the collection control server 120 can transmit at least a rule instruction 310 as a message to the first reporting device 102A and a rule instruction 320 as a message to the second reporting device 102B.

The collection control server 120 can determine the rule instruction 310 to assign or adjust the event processing rules 104A and the rule instruction 320 to assign or adjust the event processing rules 104B. For example, the collection control server 120 can analyze the actions of the program 103A, the program 103B, the first reporting device 102A, or the second reporting device 102B or analyze the traffic or data communicated on the network 108 in order to assign or adjust the event processing rules 104A or the event processing rules 104B to optimize a power consumption or a network utilization by or for the first reporting device 102A or the second reporting device 102B. If the computing environment 100 includes additional reporting devices, the collection control server 120 may similarly analyze the actions, traffic, or data communicated for those additional reporting devices in order to assign or adjust event processing rules for the first reporting device 102A, the second reporting device 102B, or the additional reporting devices.

Upon receipt of the rule instruction 310, the first reporting device 102A can adopt the event processing rules 104A indicated by the rule instruction 310 or adjust the event processing rules 104A in accordance with the rule instruction 310. Similarly, upon receipt of the rule instruction 320, the second reporting device 102B can adopt the event processing rules 104B indicated by the rule instruction 320 or adjust the event processing rules 104B in accordance with the rule instruction 320. The program 103A can then collect or report data as indicated by the event processing rule 104A after the adoption or adjustment, or the program 103B can then collect or report data as indicated by the event processing rule 104B after the adoption or adjustment.

Figure 4:
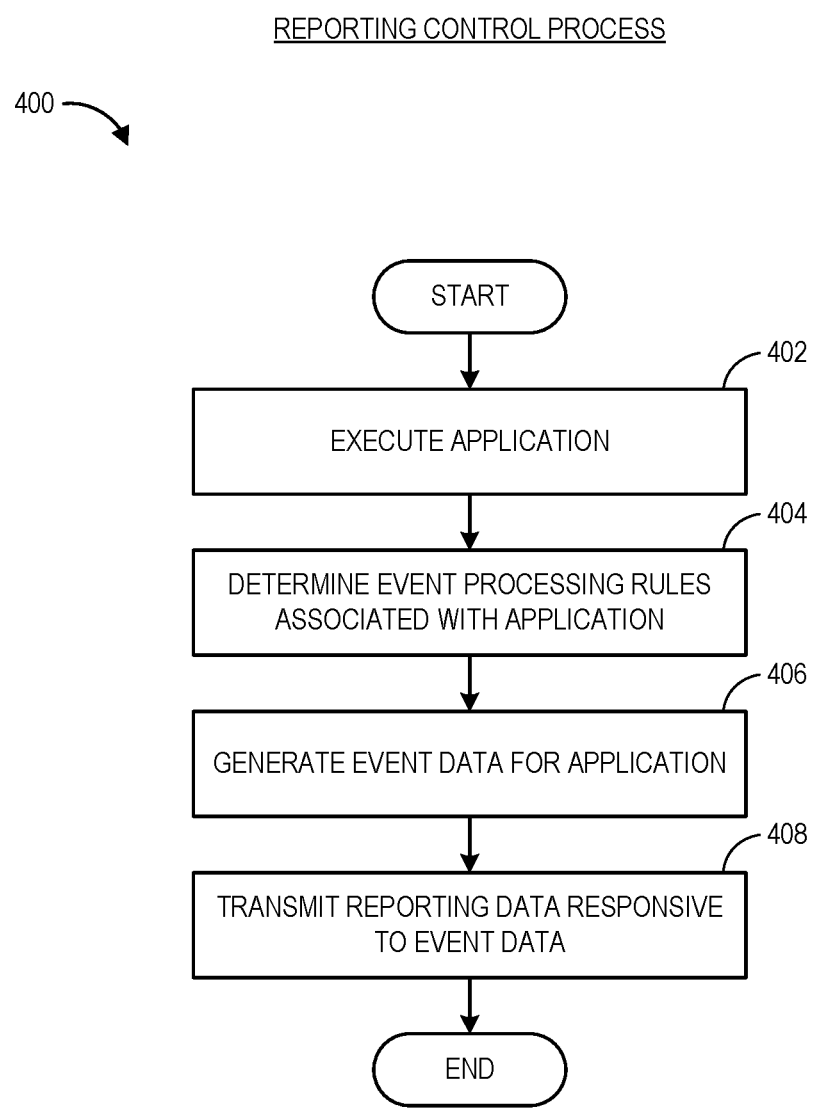
FIG. 4 illustrates an example reporting control process.

FIG. 4 illustrates a reporting control process 400. The reporting control process 400 illustrates an example mode of operation of the computing environment 100 and may be implemented by the various components shown in the computing environment 100. For convenience, the reporting control process 400 is described in the context of the computing environment 100, but may instead be implemented by other systems described herein or other computing systems not shown. The reporting control process 400 provides one example approach by which the reporting of event data by the first reporting device 102A or the second reporting device 102B can be controlled. Advantageously, in certain aspects, the reporting control process 400 can permit the reporting management to be set or influenced so that data processing or communication in the computing environment 100 may be optimized for particular situations or environments or adjusted while the data processing or communication is ongoing. The reporting control process 400 can be performed, for example, by the first reporting device 102A or the second reporting device 102B.

At block 402, the reporting control process 400 can include execution of an application. For example, the first reporting device 102A can execute the program 103A, which may, upon execution, provide functionality to the first reporting device 102A or control functionality of the first reporting device 102A. The program 103A can facilitate understanding or communication of information by a user of the first reporting device 102A or facilitate the collection of sensor data by a sensor or provide a control signal to adjust operation of another device.

At block 404, the reporting control process 400 can determine event processing rules associated with the application. For example, the first reporting device 102A can determine the event processing rules 104A (i) from a message received from the collection control server 120 via the network 108, (ii) by analyzing behavior or actions of the program 103A, the program 103B, the first reporting device 102A, or the second reporting device 102B, (iii) from analyzing traffic or data communicated on the network 108, or (iv) from a user input to the program 103A, the program 103B, the first reporting device 102A, or the second reporting device 102B. The event processing rules 104A may have been determined to optimize a power consumption or a network utilization by or for the first reporting device 102A or the second reporting device 102B. The event processing rules 104A may change over time, such as responsive to a message from the collection control server 120, a user input, or a new or updated analysis, so that the event processing by the first reporting device 102A also changes over time. In some implementations, the first reporting device 102A may generate a message to request a change to the event processing rules 104A and transmit the message to the collection control server 120 via the network 108, and the first reporting device 102A may change to the event processing rules 104A in accordance with a reply message received from the collection control server 120 so that the collection control server 120 manages the change in the event processing rules 104A.

The event processing rules may indicate that the collection or reporting of data can depend on a user engagement with the application. If a level of user engagement is characterized to be a relatively higher level of engagement, the collection or reporting of data can differ from the collection or reporting of data when the level of user engagement is characterized to be a relatively lower level of engagement. The level of user engagement can be characterized, for instance, by the program 103A or the program 103B from an engagement metric (such as, a number of user interactions with the application, a frequency of user interactions with the application, a duration of use of the application by a user, or the like), which may be compared to a threshold (which can be the same or different for the first reporting device 102A and the second reporting device 102B and may indicate an associated characterization if the threshold is satisfied) or a change of which over time can be monitored. As the level of user engagement is determined to vary over time, the collection or reporting of data can be indicated to change corresponding to the change in the level of user engagement.

The event processing rules may additionally or alternatively indicate that the collection or reporting of data can depend on a metric associated with a device power supply (for instance, a remaining power level of or a remaining useful life of a power supply of the first reporting device 102A), a metric associated with a network (for instance, a measure of traffic or latency on the network 108), an indication of a type of data to be reported (for instance, a time sensitivity indication) or a collection of data (for instance, variation in data values over time can be used to adjust collection or reporting with greater variation corresponding to increased collection or reporting), or a user input. As the metric or indication is determined to vary over time or upon receipt of the user input, the collection or reporting of data can be indicated to change corresponding to the change in the metric or indication or responsive to the user input.

The event processing rules may additionally or alternatively indicate that an approach for collection or reporting of data can be selected according to an operating condition. For example, the event processing rules 104A can indicate a first rule option and a second rule option, and either the first rule option or the second rule option may be selected by the program 103A based at least on whether one or more operations of the program 103A or the first reporting device 102A are indicative of a first operating condition or a second operating condition. When the one or more operations are indicative of the first operating condition, the first rule option can be selected. When the one or more operations are indicative of the second operating condition, the second rule option can be selected. Such a configuration may permit the program 103A to select from multiple rule options but yet enable to the event processing rules 104A to limit to available rule options.

At block 406, the reporting control process 400 can generate event data for the application. For example, the first reporting device 102A can generate event data, which may include data indicative of actions associated with the program 103A. The generation of the event data may be by the program 103A and controlled according to the event processing rules 104A. The event data can include event attributes having associated event values. The event data can be generated using one or more listeners or event handlers, which can operate in a loop to receive event notifications continuously and output event notifications for processing.

At block 408, the reporting control process 400 can transmit reporting data responsive to the event data. For example, the first reporting device 102A can send reporting data to the analytics system 130 or the collection vendor systems 140 via the network 108, and the reporting data can be responsive to the event data generated by the first reporting device 102A. The program 103A can, for instance, determine the reporting data from the event data, such as by removing redundant data from the event data or compressing the event data. The transmission of the reporting data may be controlled according to the event processing rules 104A.

The determination or transmission of the reporting data may depend on the event processing rules. For example, the event processing rules 104A can cause the program 103A to batch collect or not batch collect the event data prior to reporting, despite the first reporting device 102A being online and having a functioning communication channel via the network 108 over which the reporting data could be communicated. The event processing rules 104A may indicate that if the level of user engagement with the program 103A can be characterized as a relatively high level of user engagement, the program 103A may batch collect; in contrast, if the level of user engagement with the program 103A can be characterized as a relatively low level of user engagement, the event processing rules 104A can cause the program 103A not to batch collect the event data prior to reporting. The event processing rules 104A may indicate that batch collecting is to be performed responsive to a metric associated with a power supply of the first reporting device 102A (for instance, a remaining power level of the power supply or an estimated remaining useful life of the power supply), a metric associated with the network 108 (for instance, an measure of traffic or latency on the network 108), or an indication of a type of data to be reported (for instance, a type of data that may be time sensitive can be reported with no or limited batch collecting while a type of data that may be non-time sensitive can be reported with batch collecting). The characterization of the level of user engagement or the value of one or more metrics or indications may vary over time and can accordingly control whether the event data may be batch collected.

Desirably, the batch collection of the event data may, in some instances, result in a consolidation of the event data for reporting, which can diminish an amount of network traffic generated by the first reporting device 102A and reduce a power consumption by the first reporting device 102A because the first reporting device 102A may communicate less actively over the network 108.

The program 103A can, as part of the reporting control process 400, generate a message to indicate some or all of the event processing rules 104A and transmit the message to the collection control server 120 via the network 108. The program 103A can accordingly indicate via the message the current settings for the event processing rules 104A (such as that one or more event attributes are not transmitted according to the event processing rules 104A) to the collection control server 120.

Although the reporting control process 400 may be described as being performed by the first reporting device 102A and the program 103A according to the event processing rules 104A, the reporting control process 400 can, for instance, be similarly performed by the second reporting device 102B and the program 1038 according to the event processing rules 1048.

Figure 5:
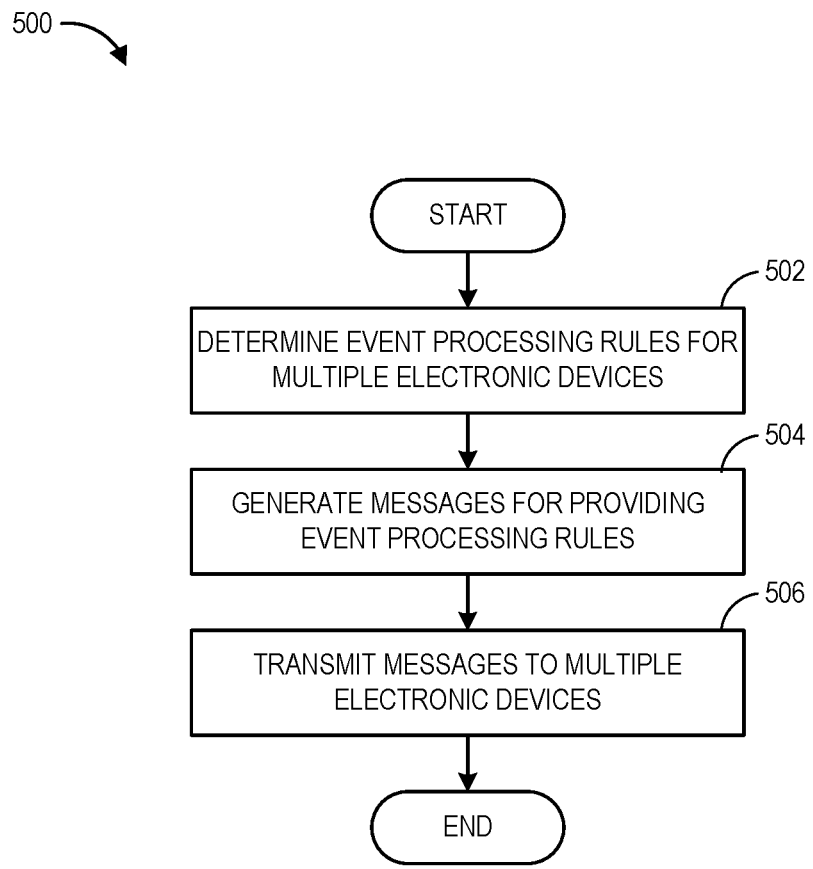
FIG. 5 illustrates an example processing rule management process.

FIG. 5 illustrates a processing rule management process 500. The processing rule management process 500 illustrates an example mode of operation of the computing environment 100 and may be implemented by the various components shown in the computing environment 100. For convenience, the processing rule management process 500 is described in the context of the computing environment 100, but may instead be implemented by other systems described herein or other computing systems not shown. The processing rule management process 500 provides one example approach by which the collection controller server 120 can determine event processing rules for multiple devices, including the first reporting device 102A and the second reporting device 102B, and accordingly instruct the multiple devices. Advantageously, in certain aspects, the processing rule management process 500 can permit the remote determination and control of reporting by the first reporting device 102A and the second reporting device 102B to optimize data processing or communication in the computing environment 100 in particular situations or environments or while the data processing or communication is ongoing. The processing rule management process 500 can be performed, for example, by the collection control server 120.

At block 502, the processing rule management process 500 can determine event processing rules for multiple electronic devices. For example, the collection control server 120 can determine the event processing rules 104A and the event processing rules 104B for the first reporting device 102A and the second reporting device 102B. The event processing rules 104A and the event processing rules 104B can be the same or different from one another and may control the reporting of event data associated with actions by applications running on the first reporting device 102A or the second reporting device 102B. The event processing rules 104A and the event processing rules 104B may be determined using a machine learning algorithm, which can process data with a rule model. The event processing rules 104A and the event processing rules 104B can be stored in a memory device of the collection control server 120 (such as the configuration data storage 122).

The collection control server 120 can analyze actions of the program 103A, the program 103B, the first reporting device 102A, or the second reporting device 102B or analyze traffic or data communicated on the network 108 in order to determine the event processing rules 104A or the event processing rules 104B to optimize (such as reduce or minimize) a power consumption or a network utilization by or for the first reporting device 102A or the second reporting device 102B. For example, the collection control server 120 can compare a metric associated with the actions, traffic, or data to assign or revise the event processing rules 104A or the event processing rules 1048. As another example, the collection control server 120 can determine the event processing rules 104A or the event processing rules 104B from a comparison of (i) a batching of events by the first reporting device 102A or the second reporting device 102B due to an optimized batch collection and (ii) a batching of events by the first reporting device 102A or the second reporting device 102B due to an offline communication status.

Additionally or alternatively, the collection control server 120 can determine the event processing rules 104A or the event processing rules 104B according at least to a group (such as a control group or a test group) in which the program 103A, the program 103B, the first reporting device 102A, or the second reporting device 102B is assigned. For instance, the first reporting device 102A can be assigned to a control group and the second reporting device 102B can be assigned to a test group, and the test group can be a group given different rules from the control group to assess an impact of the different rules.

Additionally or alternatively, the collection control server 120 can determine the event processing rules 104A or the event processing rules 104B to cause transmission of data not previously transmitted or to prevent future transmission of data previously configured to be transmitted. The collection control server 120 can identify the event processing rules 104A or the event processing rules 104B for the first reporting device 102A or the second reporting device 102B from a message from the first reporting device 102A or the second reporting device 102B that indicates data previously transmitted or not transmitted.

The event processing rules 104A or the event processing rules 104B can indicate a first rule option associated with a first operating condition and a second rule option associated with a second operating condition. Either the first rule option or the second rule option may, in turn, be selectable by the program 103A or the program 103B according to whether an operating condition determined by the program 103A or the program 103B matches the first operating condition or the second operating condition. The collection control server 120 can thus assign a range of options using the rule options and permit the first reporting device 102A or the second reporting device 102B to make a final selection.

At block 504, the processing rule management process 500 can generate messages for providing the event processing rules. For example, the collection control server 120 can determine the rule instruction 310 to assign or adjust the event processing rules 104A and the rule instruction 320 to assign or adjust the event processing rules 104B. The rule instruction 310 can be included in a first message for the first reporting device 102A, and the rule instruction 320 can be included in a second message for the second reporting device 102B.

At block 506, the processing rule management process 500 can transmit the messages to the multiple electronic devices. For example, the collection control server 120 can transmit via the network 108 the first message to the first reporting device 102A and the second message to the second reporting device 102B so that the first reporting device 102A (such as the program 103A) and the second reporting device 102B (such as the program 103B) respectively implement the event processing rules 104A and the event processing rules 104B.

The processing rule management process 500 can be initiated by the collection control server 120 in response to receiving a message from the first reporting device 102A, the second reporting device 102B, or the management user system 106. The generation or transmission of the message by the first reporting device 102A, the second reporting device 102B, or the management user system 106 can be triggered by a user input or responsive to a determination. The message can request an adjustment of the event processing rules 104A or the event processing rules 104B. The collection control server 120 can accept, reject, or revise the requested adjustment and may generate the rule instruction 310 or the rule instruction 320 responsive to the requested adjustment.

The processing rule management process 500 can be initiated by the collection control server 120 responsive to a change in a metric associated with an implementation of the event processing rules 104A by the first reporting device 102A or an implementation of the event processing rules 104B by the second reporting device 102B. The change may be identified from a comparison of the metric to a threshold (such as if the metric satisfies a threshold for a particular program or a metric for another reporting device) or from an amount or rate of the change over time.

Although the processing rule management process 500 can include determining event processing rules for multiple electronic devices and generating and transmitting messages providing the event processing rules to the multiple electronic devices, the processing rule management process 500 can include determining event processing rules for a single electronic device and generating and transmitting a single message providing the event processing rules to the single electronic device.

Event Batching Examples

The following two portions of code (Code 1 and Code 2) illustrate an example of batching-related features described herein. Code 1 illustrates batching of event data without compression. Code 2, on the other hand, illustrates batching of event data with compression. In Code 1 and Code 2 can both include code for processing event data for three events, which can each have event attributes of v, tid, cid, t, and dp. The event attributes can, in turn, have the indicated event values as assigned by the=symbol.

Code 1

```
POST /batch HTTP/1.1
Host: www.site-analytics.com
v=1&tid=UA-XXXXX-Y&cid=555&t=pageview&dp=%2Fhome
v=1&tid=UA-XXXXX-Y&cid=555&t=pageview&dp=%2Fabout
v=1&tid=UA-XXXXX-Y&cid=555&t=pageview&dp=%2Fcontact
```

Code 2

```
POST /batch HTTP/1.1
Host: www.site-analytics.com
v=1&tid=UA-XXXXX-Y&cid=555&t=pageview
&dp=%2Fhome
&dp=%2Fabout
&dp=%2Fcontact
```

As can be seen from Code 1, the event values associated with the event attributes can be identical (sometimes referred to as shared or common) for four of the five event values in Code 1. To remove the redundancy from Code 1, in Code 2, the event attributes and the associated event values that are identical can be included once rather than multiple times (such as at a top or before other event attributes) in a payload. The positioning of the dp event attribute on the second and subsequent lines indicate that the associated event values for the dp event attribute may not be identical. A data collection endpoint can process Code 2 to generate Code 1 for further processing by the data collection endpoint.

The following two portions of code (Code 3 and Code 4) illustrate examples of batching-related features described herein. Code 3 and Code 4 illustrates client-side batching with compression. Code 3 shows code in a query string format, and Code 4 shows code in a JavaScript Object Notation (JSON) format.

Code 3

```
----
POST /batch HTTP/1.1
Host: collect.tealiumiq.com
tealium_account=example&tealium_profile=main&tealium_visitor_id=ABC123DEF4
56&tealium_datasource=byco36
&tealium_event=user_login
&tealium_event=product_filter
&tealium_event=checkout
&tealium_event=purchase
----
```

Code 4

```
----
POST /batch HTTP/1.1
Host: collect.tealiumiq.com
{"tealium_account":"example","tealium_profile":"main","tealium_visitor_id":"ABC123
DEF456","tealium_datasource":"byco36"}
{"tealium_event":"user_login"}
{"tealium_event":"product_filter"}
{"tealium_event":"checkout"}
{"tealium_event":"purchase"}
----
```

The following portions of code (Code 5 and Code 6) illustrate examples of batching-related features described herein. Code 5 and Code 6 in particular illustrate batching of event data with filtering. Filtering may be performed, for instance, to (i) remove events that may be tracked when online communication is available but not when online communication is unavailable, (ii) determine a number of events (such as an optimal amount) to send on a per user basis, or (iii) remove events that may be of relatively low significance or relevance, such as events associated with certain values like a price, size, brand, or rating. The filtering can be used to entirely remove the filtered events from transmitted data or instead remove a fraction of the filtered events from transmitted data (such as to remove every nth event or to remove all but a most recent n events, where n is an integer).

Code 5

```
----
POST /batch HTTP/1.1
Host: collect.tealiumiq.com
{"tealium_account":"example","tealium_profile":"main","tealium_visitor_id":"ABC123
DEF4 56","tealium_datasource":"byco36"}
{"tealium_event":"user_login"}
{"tealium_event":"product_filter","filter_type":"price","filter_detail":"<100"}
{"tealium_event":"product_filter","filter_type":"size","filter_detail":"small"}
{"tealium_event":"product_filter","filter_type":"brand","filter_detail":"acme"}
{"tealium_event":"product_filter","filter_type":"rating","filter_detail":"5"}
{"tealium_event":"product_filter","filter_type":"price","filter_detail":">100"}
{"tealium_event":"product_filter","filter_type":"rating","filter_detail":">=4"}
{"tealium_event":"checkout"}
{"tealium_event":"purchase"}
----
```

Code 6

```
----
POST /batch HTTP/1.1
Host: collect.tealiumiq.com
{"tealium_account":"example","tealium_profile":"main","tealium_visitor_id":"ABC123
DEF4 56","tealium_datasource":"byco36"}
{"tealium_event":"user_login"}
{"tealium_event":"product_filter","filter_type":"price","filter_detail":">100"}
{"tealium_event":"product_filter","filter_type":"rating","filter_detail":">=4"}
{"tealium_event":"checkout"}
{"tealium_event":"purchase"}
----
```

Computer System Components

Figure 6:
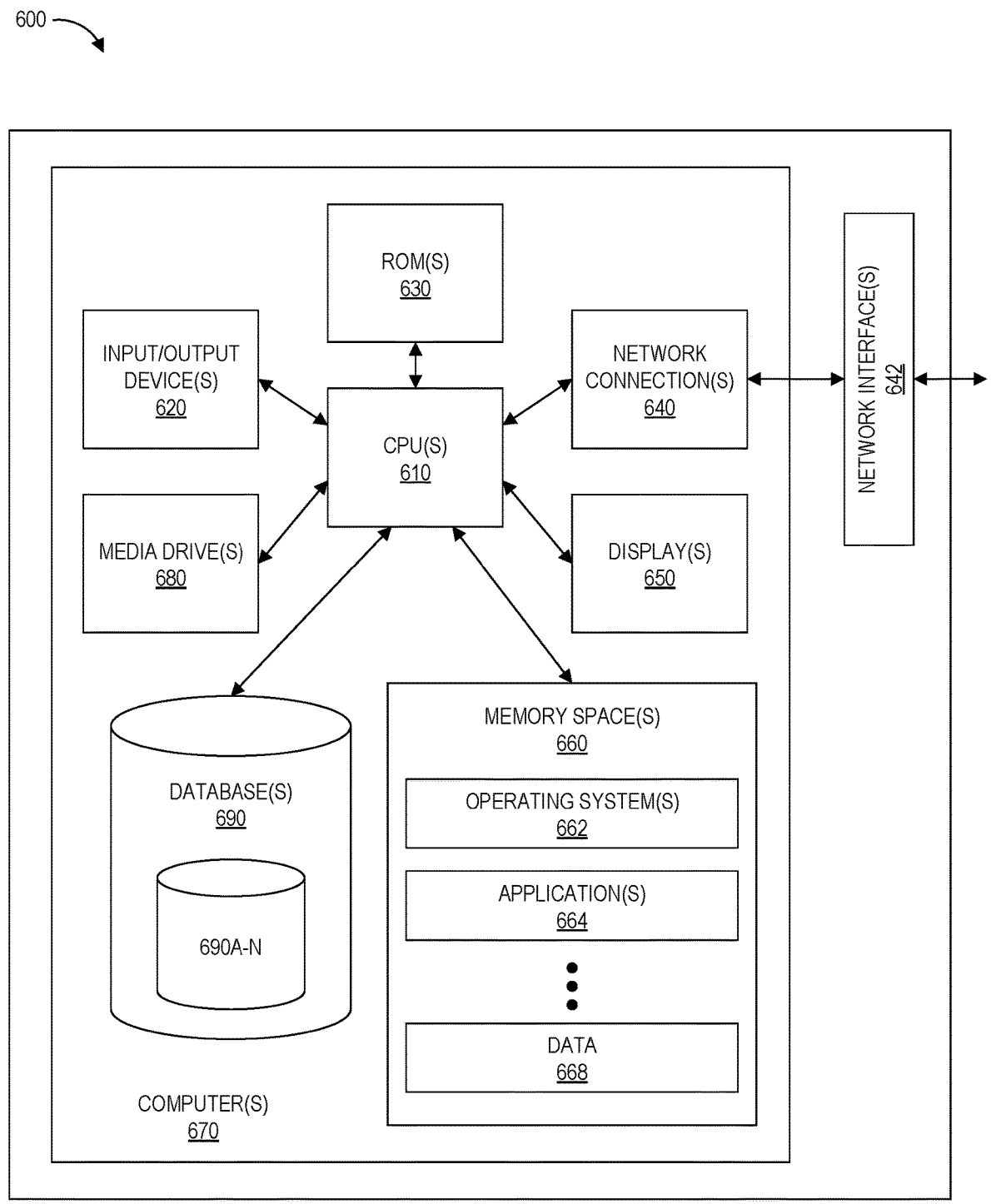
FIG. 6 illustrates example components usable to construct one or more of the devices, systems, or servers within the computing environment of FIG. 1.

FIG. 6 illustrates a computer system 600 usable to construct one or more of the devices (for instance, the first reporting device 102A and the second reporting device 102B), systems (for instance, the management user system 106, the analytics system 130, and the collection vendor systems 140), servers (for instance, the collection control server 120), or the like within the computing environment 100 of FIG. 1.

As shown in FIG. 6, the computer system 600 can include (i) a processor(s) (CPUs) 610, (ii) an input/output device(s) 620 configured to allow users to input and output information and interact with the computer system 600 as well as transfer and receive data or capture data with one or more sensors, (iii) a read only memory device(s) (ROMs) 630 or equivalents to provide nonvolatile storage of data or programs, (iv) a display(s) 650 such as a computer monitor or other display device, (v) a network connection(s) 640 and a network interface(s) 642 configured to allow the computer system 600 to connect to other systems, servers, or portable devices, as well as a memory space(s) 660 and a database(s) 690. The database(s) 690 may be further divided or distributed as sub-database(s) 690A-690N, with the sub-database(s) storing feature or function specific information associated with a particular feature or function. The various components shown in FIG. 6 may be incorporated in a computer(s) 670. It is noted that the various components shown in FIG. 6, including the database(s) 690, are typically included as part of the computer(s) 670, however, they may be external to the computer(s) 670 in some aspects. For example, the database(s) 690 may be external to the computer(s) 670 and may be part of a separate database computer system or networked database system. In some instances, the computer system 600 may be a computing device like a desktop computer, mobile phone, or a server.

The memory space(s) 660 may include DRAM, SRAM, FLASH, hard disk drives, or other memory storage devices, such as a media drive(s) 680, configured to store an operating system(s) 662, an application program(s) 664, and data 668, and the memory space(s) 660 may be shared with, distributed with or overlap with the memory storage capacity of the database(s) 690. In some aspects, the memory space(s) 660 may include the database(s) 690 or in some aspects the database(s) 690 may include the data 668 as shown in the memory space(s) 660. The data stored in the memory space(s) 660 or the database(s) 690 may include information, such as event data, event processing rules, data processing routines, or other types of data described herein.

IV. Additional Aspects and Terminology

Many other variations than those described herein will be apparent from this disclosure. For example, depending on the aspects, certain acts, events, or functions of any of the algorithms described herein can be performed in a different sequence, can be added, merged, or left out altogether (e.g., not all described acts or events are necessary for the practice of the algorithms). Moreover, in certain aspects, acts or events can be performed concurrently, e.g., through multi-threaded processing, interrupt processing, or multiple processors or processor cores or on other parallel architectures, rather than sequentially. In addition, different tasks or processes can be performed by different machines or computing systems that can function together.

As used herein, the terms "application" or "program," in addition to having their ordinary meanings, can refer to an executable code that when executed by a hardware processor causes the hardware processor to perform operations in accordance with the executable code. In some instances, an application or a program, moreover, may refer to executable code that was previously compiled.

One or more parts of or all of the analytics system 130 or collection control server 120 can, in some aspects, be implemented in a distributed cloud platform that provides redundant or geographically dispersed access (for example, using a Multi-Content Delivery Network). Although not illustrated herein, the implementation of the distributed cloud platform can be similar in some respects to the distributed cloud platform described and illustrated with respect to FIG. 25 of U.S. Pat. No. 8,805,946, titled "SYSTEM AND METHOD FOR COMBINING CONTENT SITE VISITOR PROFILES," which is incorporated by reference herein in its entirety.

One or more of the features, devices, servers, or systems described herein can be combined with or performed along with one or more of the features, devices, servers, or systems described in U.S. Pat. No. 8,843,827, titled "ACTIVATION OF DORMANT FEATURES IN NATIVE APPLICATIONS," U.S. Pat. No. 9,363,311, titled "DELIVERY OF INSTRUCTIONS IN HOST APPLICATIONS," U.S. Pat. No. 9,807,184, titled "CONFIGURATION OF CONTENT SITE USER INTERACTION MONITORING IN DATA NETWORKS," and U.S. Pat. No. 10,327,018, titled "ENGAGEMENT TRACKING IN COMPUTER DATA NETWORKS." The disclosures of the foregoing patents are hereby incorporated by reference in their entirety.

Although the network 108 is shown as one connected network, the network 108 can be subdivided into one or more separate networks which may not directly communicate with one another. For example, the analytics system 130 can communicate with the collection control server 120 via a separate and different network from the network that the collection control server 120 uses to communicate with the first reporting device 102A and the second reporting device 1028.

One or more user inputs described in this disclosure may be received using one or more different mechanisms. For example, user interface controls may be selected by a user using one or more input options, such as a mouse, touch screen input, or keyboard input, among other user interface input options. The user interface controls selected by the user can include one or more of buttons, dropdown boxes, select boxes, text boxes, check boxes, slider controls, or other user interface controls.

The various illustrative logical blocks, modules, and algorithm steps described in connection with the aspects disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the aspects disclosed herein can be implemented or performed by a machine, a microprocessor, a state machine, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A hardware processor can include electrical circuitry or digital logic circuitry configured to process computer-executable instructions. In another aspect, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the aspects disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain aspects include, while other aspects do not include, certain features, elements or states. Thus, such conditional language is not generally intended to imply that features, elements or states are in any way required for one or more aspects or that one or more aspects necessarily include logic for deciding, with or without author input or prompting, whether these features, elements or states are included or are to be performed in any particular aspect. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various aspects, it will be understood that various omissions, substitutions, and changes in the form and details of the devices or algorithms illustrated can be made without departing from the spirit of the disclosure. As will be recognized, certain aspects described herein can be embodied within a form that does not provide all of the features and benefits set forth herein, as some features can be used or practiced separately from others.

What is claimed:

1. A system for processing event data for an application and transmitting the event data via a computer network, the system comprising:
   a memory device configured to store an application; and
   a hardware processor in communication with the memory device, the hardware processor being configured to:
   execute the application,
   characterize a user engagement with the application as being a first level of engagement or a second level of engagement,
   generate first event data responsive to first user interactions with the application during a first time period,
   determine that the user engagement with the application at a first time is characterized as the first level of engagement,
   responsive to determining that the user engagement with the application at the first time is characterized as the first level of engagement,
   batch collect the first event data, and
   transmit first reporting data to a computing device via a computer network, the first reporting data being responsive to the first event data,
   generate second event data responsive to second user interactions with the application during a second time period different from the first time period,
   determine that the user engagement with the application at a second time different from the first time is characterized as the second level of engagement, and
   responsive to determining that the user engagement with the application at the second time is characterized as the second level of engagement,
   limit batch collection of the second event data more than batch collection of the first event data is limited, and
   transmit second reporting data to the computing device via the computer network, the second reporting data being responsive to the second event data.

2. The system of claim 1, wherein the hardware processor is configured to characterize the user engagement according to a number of user interactions with the application, a frequency of user interactions with the application, or a duration of use of the application by a user.

3. The system of claim 1, wherein the hardware processor is configured to continue to batch collect the first event data while the hardware processor is able to transmit to the computing device via the computer network.

4. The system of claim 1, wherein the first reporting data indicates that the first event data was batched for optimization purposes rather than due the hardware processor being unable to transmit to the computing device via the computer network.

5. The system of claim 1, wherein the hardware processor is configured to, responsive to determining that the user engagement with the application at the second time is characterized as the second level of engagement, not batch collect the second event data.

6. The system of claim 1, wherein the hardware processor is configured to:
   identify duplicate data in the first event data and remove the duplicate data from the first event data to generate the first reporting data; or
   compress the first event data to generate the first reporting data.

7. A method for processing event data for an application and transmitting the event data via a computer network, the method comprising:

under control of a hardware processor of a physical computing device:

executing an application;

characterizing a user engagement with the application at a first time as being a first level of engagement;

generating first event data responsive to a first plurality of user interactions with the application;

responsive to characterizing the user engagement with the application at the first time as being the first level of engagement, batch-collecting the first event data, and transmitting first reporting data to a computing device via a computer network, the first reporting data being responsive to the first event data;

characterizing the user engagement with the application at a second time as being a second level of engagement;

generating second event data responsive to a second plurality of user interactions with the application; and responsive to characterizing the user engagement with the application at the second time as being the second level of engagement, transmitting second reporting data to the computing device via the computer network without batch-collecting the second event data, the second reporting data being responsive to the second event data.

8. The method of claim 7, wherein the user engagement with the application at the first time is characterized as being the first level of engagement from a comparison of a first engagement metric for the first time to an engagement threshold, and the user engagement with the application at the second time is characterized as being the second level of engagement from a comparison of a second engagement metric for the second time to the engagement threshold.

9. The method of claim 7, wherein the user engagement with the application at the first time is characterized as being the first level of engagement due to a number of user interactions with the application or a frequency of user interactions with the application.

10. The method of claim 7, wherein the user engagement with the application at the first time is characterized as being the first level of engagement due to a duration of use of the application by a user over a time period.

11. The method of claim 7, further comprising adjusting, responsive to a user input, a condition for causing the first reporting data to be transmitted.

12. The method of claim 7, further comprising adjusting, responsive to a metric associated with a power supply for the hardware processor, a condition for causing the first reporting data to be transmitted.

13. The method of claim 7, further comprising adjusting, responsive to a type of data included in the first event data, a condition for causing the first reporting data to be transmitted.

14. The method of claim 7, further comprising generating the first reporting data from the first event data by removing duplicate data from the first event data or compressing the first event data.

15. The method of claim 7, further comprising detecting, via a user interface of the physical computing device, the first plurality of user interactions and the second plurality of user interactions.

16. Non-transitory physical computer storage comprising computer-executable instructions stored thereon that, when executed by one or more processors, are configured to implement a process comprising:

executing an application;

characterizing a user engagement with the application at a first time as being a first level of engagement;

generating first event data responsive to a first plurality of user interactions with the application;

responsive to characterizing the user engagement with the application at the first time as being the first level of engagement, batch-collecting the first event data using a first approach, and transmitting first reporting data to a computing device via a computer network, the first reporting data being responsive to the first event data;

characterizing the user engagement with the application at a second time as being a second level of engagement;

generating second event data responsive to a second plurality of user interactions with the application; and responsive to characterizing the user engagement with the application at the second time as being the second level of engagement, batch-collecting the second event data using a second approach that limits batch collection more than the first approach, and transmitting second reporting data to the computing device via the computer network the second reporting data being responsive to the second event data.

17. The non-transitory physical computer storage of claim 16, wherein the user engagement with the application at the first time is characterized as being the first level of engagement due to a number of user interactions with the application, a frequency of user interactions with the application, or a duration of use of the application by a user over a time period.

18. The non-transitory physical computer storage of claim 16, wherein the first plurality of user interactions comprise a plurality of user selections of elements of the application.

19. The non-transitory physical computer storage of claim 16, the process further comprising adjusting, responsive to a metric associated with a power supply for the one or more processors or a type of data included in the first event data, a condition for causing the first reporting data to be transmitted.

20. The non-transitory physical computer storage of claim 16, the process further comprising generating the first reporting data from the first event data by removing redundant data from the first event data or compressing the first event data.

* * * * *

UNITED STATES PATENT AND TRADEMARK OFFICE
CERTIFICATE OF CORRECTION

PATENT NO. : 11,095,735 B2
APPLICATION NO. : 16/985539
DATED : August 17, 2021
INVENTOR(S) : Gavin et al.

It is certified that error appears in the above-identified patent and that said Letters Patent is hereby corrected as shown below:

In the Specification

In Column 14, Line 5, delete "1048" and insert --104B--.

In Column 14, Line 5, delete "1038" and insert --103B--.

In Column 14, Line 9, delete "1048" and insert --104B--.

In Column 14, Line 10, delete "1038" and insert --103B--.

In Column 14, Line 11, delete "1028" and insert --102B--.

In Column 14, Line 18, delete "1028" and insert --102B--.

In Column 14, Line 22, delete "1028" and insert --102B--.

In Column 14, Line 27, delete "1028" and insert --102B--.

In Column 14, Line 31, delete "1028" and insert --102B--.

In Column 14, Line 35, delete "1048" and insert --104B--.

In Column 14, Line 39, delete "1048" and insert --104B--.

In Column 14, Line 51, delete "1028" and insert --102B--.

In Column 15, Line 15, delete "1028" and insert --102B--.

In Column 15, Line 39, delete "1028" and insert --102B--.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,095,735 B2

In Column 15, Line 54, delete "1028" and insert --102B--.

In Column 15, Line 61, delete "1028" and insert --102B--.

In Column 16, Line 34, delete "1038" and insert --103B--.

In Column 16, Line 40, delete "1048" and insert --104B--.

In Column 16, Line 47, delete "1028" and insert --102B--.

In Column 16, Line 53, delete "1038" and insert --103B--.

In Column 16, Line 57, delete "1048" and insert --104B--.

In Column 16, Line 65, delete "1028" and insert --102B--.

In Column 17, Line 6, delete "1048" and insert --104B--.

In Column 19, Line 66, delete "1038" and insert --103B--.

In Column 19, Line 67, delete "1048" and insert --104B--.

In Column 20, Line 29, delete "1028" and insert --102B--.

In Column 20, Line 43, delete "1028" and insert --102B--.

In Column 20, Line 52, delete "1048" and insert --104B--.

In Column 20, Line 59, delete "1028" and insert --102B--.

In Column 20, Line 65, delete "1028" and insert --102B--.

In Column 21, Line 6, delete "1048" and insert --104B--.

In Column 21, Line 13, delete "1028" and insert --102B--.

In Column 21, Line 16, delete "1048" and insert --104B--.

In Column 21, Line 26, delete "1028" and insert --102B--.

In Column 21, Line 36, delete "1028" and insert --102B--.

In Column 21, Line 42, delete "1028" and insert --102B--.

In Column 21, Line 46, delete "1048" and insert --104B--.

In Column 26, Line 36, delete "1028" and insert --102B--.

In the Claims

In Column 30, Line 36, Claim 16, delete "network" and insert --network,--.